Patented Aug. 21, 1928.

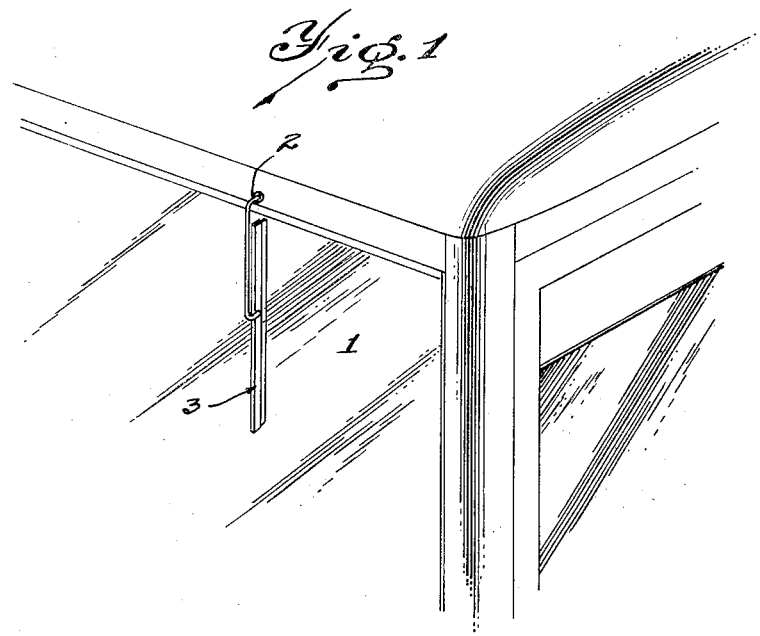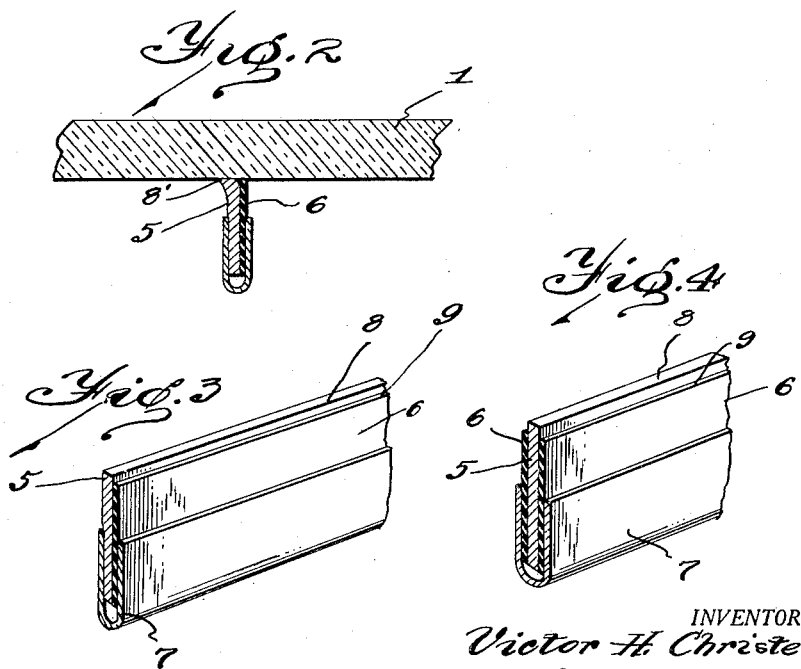

1,681,395

UNITED STATES PATENT OFFICE.

VICTOR H. CHRISTEN, OF DETROIT, MICHIGAN.

WINDSHIELD WIPER.

Application filed July 14, 1926. Serial No. 122,314.

This invention relates to wind-shield wipers and has to do more particularly with a wiper blade for wiping the exterior surface of the wind-shield of an automobile.

Heretofore, wind-shield wipers have been provided with a blade having a strip of rubber which contacted with the exterior surface of a glass wind-shield, for the purpose of wiping off rain, sleet, or snow. This type of wiper requires frequent operation, whether the rain be heavy or light, as very few rain drops interfere materially with the transparency of the glass. Where the wind shield wiper is of the hand operated type, frequent operation thereof is objectionable and dangerous, as the driver of the automobile must divide his attention between driving and operating the wiper. Where the wiper mechanism is of automatic type, the operation of the wiper must be substantially continuous in order to maintain the glass of the windshield sufficiently transparent for driving purposes.

It has also been proposed to make a blade for a wind-shield wiper of a strip of felt treated with a chemical or composition for the purpose of treating the glass to prevent formation of rain drops thereon. This type of wiper is objectionable because it does not remove dust and dirt which accumulates on the wind-shield. Moreover, there is a tendency for the felt, which itself becomes dirty and dusty, to leave a film of such dust as it is moved across the glass. This dust interferes materially with the transparency of the glass. This condition is particularly noticeable where the rain is not sufficiently heavy to wash away the dust and, as a result, it is difficult, if not almost impossible, for the driver of the automobile to see through the windshield.

The present invention aims to provide a wind-shield wiper which overcomes the objections to the wipers which have heretofore been proposed. The wiper blade is such that only infrequent operation thereof is required, whether the rain be light or heavy, and at the same time, the wiper blade is such as to remove the dust which may have accumulated on the exterior surface of the wind shield or which may be deposited thereon by the wiper blade itself. The wiper blade is such that it can be used with automatic wiper mechanism, or it can be used with a wiper of the hand operated type, and will, at all times, maintain the wind-shield glass sufficiently transparent for driving purposes.

The invention will be better understood by reference to the accompanying drawings wherein:

Fig. 1 is a perspective view showing the wiper secured adjacent the wind-shield of an automobile.

Fig. 2 is a sectional view of the wiper blade contacting with the surface of a wind-shield.

Fig. 3 is a perspective view of the wiper blade.

Fig. 4 is a view showing a modified form of the blade.

Referring to the drawings, the glass windshield of an automobile is indicated at 1, and a wind-shield wiper mechanism is provided with an arm 2 which carries a wiper blade 3. Operation of the wiper mechanism will be readily understood by reference to Fig. 1. The arm 2 is free to rock so as to reciprocate the blade 3 upon the upper surface of the glass. The arm 2 is operative from the interior of the automobile, and this may be accomplished by hand operation or by automatic mechanism.

The wiper blade consists of a strip of absorbent material 5, such as felt, which is treated with a suitable chemical or composition for the purpose of treating the windshield glass so as to prevent rain from interfering with the transparency of the glass, such as the composition disclosed in my Patent No. 1,201,440 of October 17, 1916, which consists of a mixture of resin oil, whiting, petroleum and lamp black. The wiper blade also includes a strip of rubber 6 which is coextensive with the felt strip. These two strips are fixed together by means of a metal back 7, which is composed of a length of metal bent along its length and clamped over the two strips. This is an advantageous way of securing the felt strip and the rubber strip together, although it will be understood that the two strips may be secured together in any other desired manner. The felt strip, the rubber strip and the metal back 7 form the wiper blade, and all are of substantially the same length. The impregnated material may be a material which is artificially impregnated, or it may be a material which is naturally impregnated.

By reference to Fig. 3, it will be observed that the felt strip 5 projects, as shown at 8, somewhat above the outermost edge 9 of the rubber strip 6 so that the working edge of the felt projects beyond the working edge of the rubber. When the device is in use the felt material is pressed against the glass with slight pressure, and it is somewhat compressed, as shown at 8' (Fig. 2). The arrangement is such that when the felt is compressed, the rubber strip contacts relatively lightly with the surface of the glass.

The rubber strip, being thus pressed against the glass with only a light pressure, does not dry off the glass so as to destroy the treatment which results from the treated felt. In a movement of the wiper from left to right of Fig. 2, the rubber strip precedes the felt strip. The rubber cleans off the dust which has accumulated on the surface of the glass, and the felt strip treats the glass with the compound which prevents the formation of drops of water. On a movement from right to left, the felt strip continues to chemically treat the surface of the glass and, should the felt strips be dusty or dirty it will tend to deposit particles of dust or dirt upon the glass. This is removed by the rubber wiping strip which presses against the glass with sufficient pressure for this purpose but not sufficient to destroy the effect of the chemical treatment.

The modified form of wiper, as shown in Fig. 4, includes a rubber wiping strip on either side of the absorbent material containing the treating chemical. In this form of blade there is a wiping effect of the glass preceding the application of the chemical, regardless of which way the blade is first moved across the surface of the glass.

It will thus be observed that the wind shield wiper will keep the wind shield in a transparent condition with infrequent operations thereof. The application of the chemical to the surface of the glass prevents rain from interfering with the transparency thereof, and the rubber wiping strip serves to keep the glass free from dust or other foreign matter which would interfere with the transparency of the glass. The wiper is particularly effective in a light rain which is not sufficient to wash away the dust or dirt on the wind-shield. The rubber strip wipes the dust or dirt from the wind-shield and the application of the chemical by the felt treats the glass so that the wiper need only be operated at quite infrequent intervals.

I claim:

1. In a wind-shield wiper, a wiper blade comprising a strip of material impregnated with a substance for treating the surface of the glass to prevent the formation of rain drops thereon and a strip of flexible material positioned along side the said impregnated material for wiping the glass, the impregnated material being more compressible than the said flexible material and the working edge of the said impregnated material projecting beyond the working edge of the flexible strip whereby the same is compressed in use so that both strips contact with the surface of the glass.

2. In a windshield wiper, a glass stroking tool arranged to be drawn over the glass and comprising a member impregnated with a substance adapted to prevent the accumulation of water on the glass in the form of drops, a second flexible member of non-absorbing material adapted to wipe the glass, and means for supporting said members so that together they are drawn across the glass substantially in the same path.

In testimony whereof I affix my signature.

VICTOR H. CHRISTEN.